United States Patent
Katsuma et al.

(10) Patent No.: US 8,979,616 B2
(45) Date of Patent: Mar. 17, 2015

(54) GEAR PROCESSING MACHINE

(75) Inventors: Toshifumi Katsuma, Tokyo (JP); Koichi Masuo, Tokyo (JP); Michiaki Hashitani, Tokyo (JP); Yuji Ashizawa, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 201 days.

(21) Appl. No.: 13/580,396

(22) PCT Filed: Sep. 30, 2010

(86) PCT No.: PCT/JP2010/067022
§ 371 (c)(1),
(2), (4) Date: Oct. 11, 2012

(87) PCT Pub. No.: WO2011/121822
PCT Pub. Date: Oct. 6, 2011

(65) Prior Publication Data
US 2013/0045667 A1    Feb. 21, 2013

(30) Foreign Application Priority Data
Mar. 31, 2010  (JP) .................................. 2010-080728

(51) Int. Cl.
*B23F 5/04* (2006.01)
*B23F 23/00* (2006.01)

(52) U.S. Cl.
CPC ................. *B23F 5/04* (2013.01); *B23F 23/006* (2013.01)
USPC ............................................ 451/253; 451/47

(58) Field of Classification Search
USPC .................. 451/47, 253, 5, 8, 9, 10
See application file for complete search history.

(56) References Cited

U.S. PATENT DOCUMENTS 6,565,418 B1 * 5/2003 Feisel .............................. 451/10
8,527,085 B2 * 9/2013 Breith et al. ................... 700/164
(Continued)

FOREIGN PATENT DOCUMENTS

CN   101547765 A   9/2009
JP   2002-532265 A  10/2002
(Continued)

OTHER PUBLICATIONS

Chinese Office Action dated Feb. 25, 2014 for corresponding Application No. 201080065089.X with an English translation.
(Continued)

*Primary Examiner* — Robert Rose
(74) *Attorney, Agent, or Firm* — Birch, Stewart, Kolasch & Birch, LLP

(57) ABSTRACT

A gear grinding machine wherein a tooth alignment operation is performed prior to grinding, is equipped with a workpiece processing rotation shaft (22) which rotates a workpiece (W1) located at a workpiece processing position (P2); a workpiece swing device (30) whereby a tailstock (50) that holds the workpiece (W1) is swung between a workpiece replacement position (P1) and a workpiece processing position; a workpiece alignment rotation shaft (52) which rotates the workpiece held by the tailstock (50); and a tooth alignment sensor (43) that detects the rotation phase of the workpiece, which was rotated by the workpiece alignment rotation shaft. Before the workpiece held by the tailstock is placed at the workpiece processing position, the rotation of the workpiece alignment rotation shaft is controlled on the basis of the rotation phase detected, so that the workpiece will engage with a threaded grinding stone (16).

2 Claims, 4 Drawing Sheets

(56) References Cited

U.S. PATENT DOCUMENTS

| | | |
|---|---|---|
| 2006/0025050 A1 | 2/2006 | Yanase et al. |
| 2006/0257721 A1 | 11/2006 | Xu et al. |
| 2010/0041314 A1 | 2/2010 | Kurashiki et al. |

FOREIGN PATENT DOCUMENTS

| | | |
|---|---|---|
| JP | 2006-35400 A | 2/2006 |
| JP | 2006-341364 A | 12/2006 |
| JP | 2006-341365 A | 12/2006 |
| JP | 2006-341366 A | 12/2006 |
| JP | 2006-341367 A | 12/2006 |
| JP | 2008-188717 A | 8/2008 |
| WO | WO 00/35621 A1 | 6/2000 |

OTHER PUBLICATIONS

International Search Report and Written Opinion of the International Searching Authority for International Application No. PCT/JP2010/067022 mailed Nov. 16, 2010 with English translation.

\* cited by examiner

GEAR PROCESSING MACHINE

TECHNICAL FIELD

The present invention relates to a gear processing machine configured to perform a tooth alignment operation before grinding a processing target gear using a grinding wheel, the tooth alignment operation causing the threaded grinding wheel and the processing target gear to establish a meshable rotational phase relationship.

BACKGROUND ART

A gear grinding machine has been conventionally provided as a machine which grinds a thermally treated gear by using a threaded grinding wheel or the like to efficiently finish the tooth surfaces of the gear. In such a gear grinding machine, the gear is ground by rotating the threaded grinding wheel and the gear relative to each other with the threaded grinding wheel and the gear meshed with each other. Hence, before the threaded grinding wheel and the gear are meshed with each other to grind the gear, a tooth alignment operation is performed in which edges (crests and troughs) of the threaded grinding wheel and teeth (crests and troughs) of the gear establish a meshable rotational phase relationship.

Moreover, among the gear grinding machines, a gear grinding machine as follows is provided. In order to reduce a processing cycle time, the gear grinding machine controls the rotational phase of a gear to complete the tooth alignment operation described above, before the gear is conveyed to a workpiece processing position. Such a gear grinding device configured to perform the tooth alignment operation is disclosed, for example, in Patent Document 1.

PRIOR ART DOCUMENT

Patent Document

Patent Document 1: Published Japanese Translation of PCT International Application No. 2002-532265

SUMMARY OF THE INVENTION

Problems to be Solved by the Invention

The grinding of the gear requires highly accurate positioning to secure a target processing accuracy and a rotational driving force large enough to withstand a processing load. Accordingly, a motor which is large and highly accurate tends to be used as a workpiece processing motor for rotating the gear during the grinding.

Moreover, in the conventional gear grinding machine described above, the gear is revolved by using a turning plate, between a workpiece replacement position for performing replacement with an unprocessed gear and a workpiece processing position for grinding the gear. Multiple workpiece processing motors as described above are provided in the turning plate itself. However, in such a configuration, a motor for rotating the turning plate is also required to be a motor which is large and highly accurate. Moreover, since it is difficult to position the turning plate having an increased weight with high accuracy, the processing accuracy may be deteriorated.

The present invention solves the problems described above and an objective thereof is to provide a gear processing machine capable of processing a gear with high accuracy in a simple configuration.

Means for Solving the Problems

A gear processing machine according to a first aspect of the invention for solving the above problem is a gear processing machine configured to perform a tooth alignment operation before processing a processing target gear using a gear processing tool, the tooth alignment operation causing the gear processing tool and the processing target gear to establish a meshable rotational phase relationship, the gear processing machine characterized in that the gear processing machine comprises:

a workpiece processing rotary shaft rotatably supported by a bed and configured to rotate the processing target gear placed at a workpiece processing position for performing the processing by the gear processing tool;

a tailstock capable of holding the processing target gear;

workpiece revolution means, rotatably supported on the bed, for supporting the tailstock movably in a workpiece revolution axis direction and for causing the tailstock to revolve about the workpiece revolution axis, between the workpiece processing position and a workpiece replacement position for performing replacement with an unprocessed processing target gear;

workpiece moving means, provided in the workpiece revolution means, for moving the tailstock in the workpiece revolution axis direction;

a workpiece tooth aligning rotary shaft provided in the tailstock and configured to rotate the processing target gear held by the tailstock;

rotational phase detection means for detecting a rotational phase of the processing target gear rotated by the workpiece tooth aligning rotary shaft; and control means for controlling a rotation of the workpiece tooth aligning rotary shaft to cause the processing target gear to have such a rotational phase as to be meshable with the gear processing tool, on the basis of the rotational phase detected by the rotational phase detection means, before the processing target gear held by the tailstock is placed at the workpiece processing position by the workpiece revolution means and the workpiece moving means.

A gear processing machine according to a second aspect of the invention for solving the above problem is characterized in that the gear processing tool is a threaded grinding wheel having a helical thread formed on an outer peripheral surface thereof, and after controlling the rotation of the workpiece tooth aligning rotary shaft to cause the processing target gear to have such a rotational phase as to be meshable with the gear processing tool on the basis of the rotational phase detected by the rotational phase detection means before the processing target gear held by the tailstock is placed at the workpiece processing position by the workpiece revolution means and the workpiece moving means, the control means further controls the rotation of the workpiece tooth aligning rotary shaft to cause the processing target gear to rotate at a same rotational speed as a rotational speed of the workpiece processing rotary shaft rotating synchronously with the threaded grinding wheel.

Effect of the Invention

In the gear processing machine of the present invention, the workpiece processing rotary shaft is rotatably supported by the bed while the workpiece tooth aligning rotary shaft is rotatably supported in the tailstock of the workpiece revolution means rotatably supported by the bed. This allows the workpiece processing rotary shaft and the workpiece tooth aligning rotary shaft to rotate separately. Hence, the processing of the processing target gear can be performed with high accuracy in a simple configuration.

MODES FOR CARRYING OUT THE INVENTION

A gear processing machine of the present invention is described below in detail by using the drawings. Note that, in the embodiment modes described below, the gear processing machine of the present invention is applied to a gear grinding machine.

Embodiments

Figure 1:
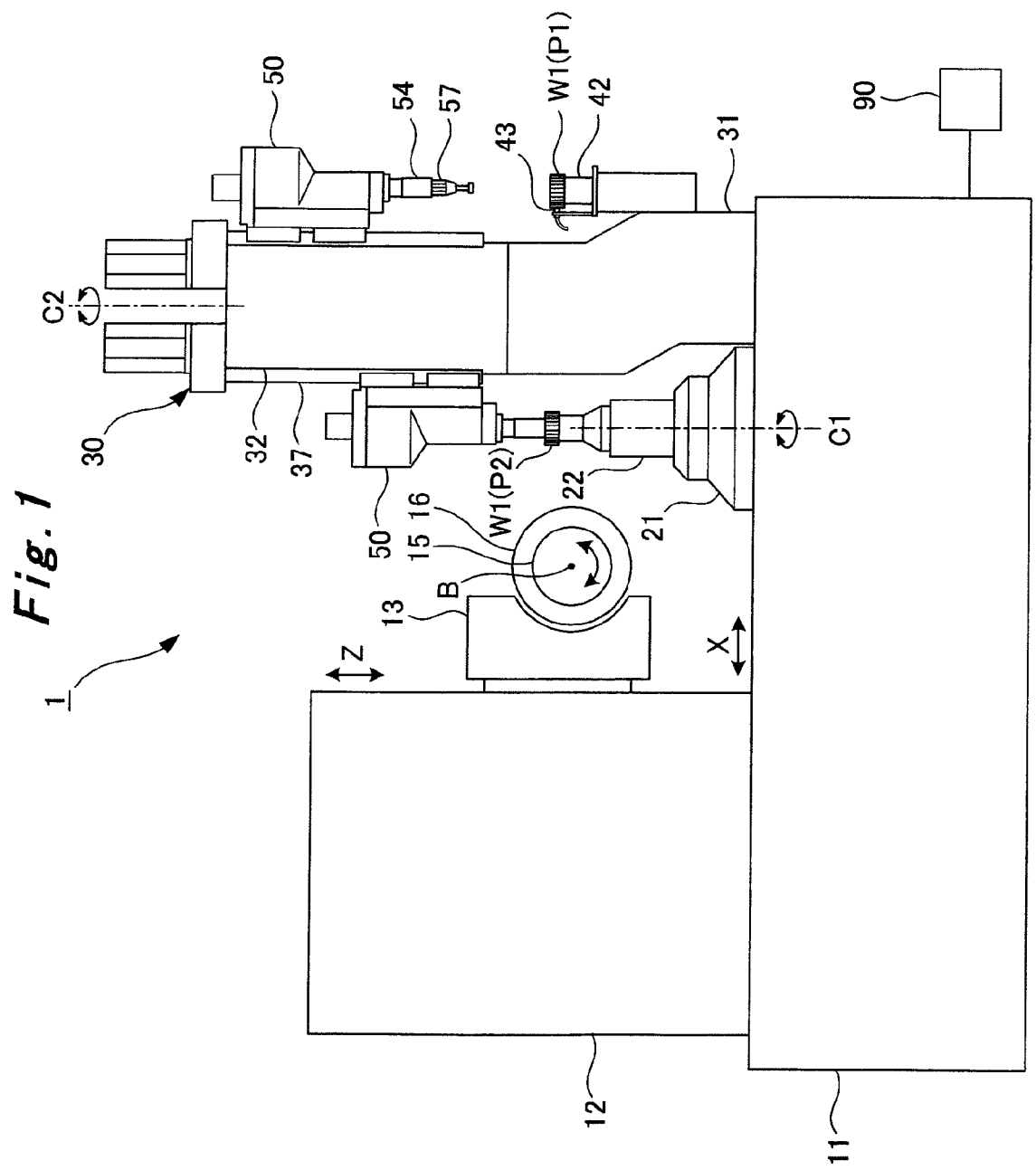
FIG. 1 is a front view of a gear grinding machine in an embodiment of the present invention.
Figure 2:
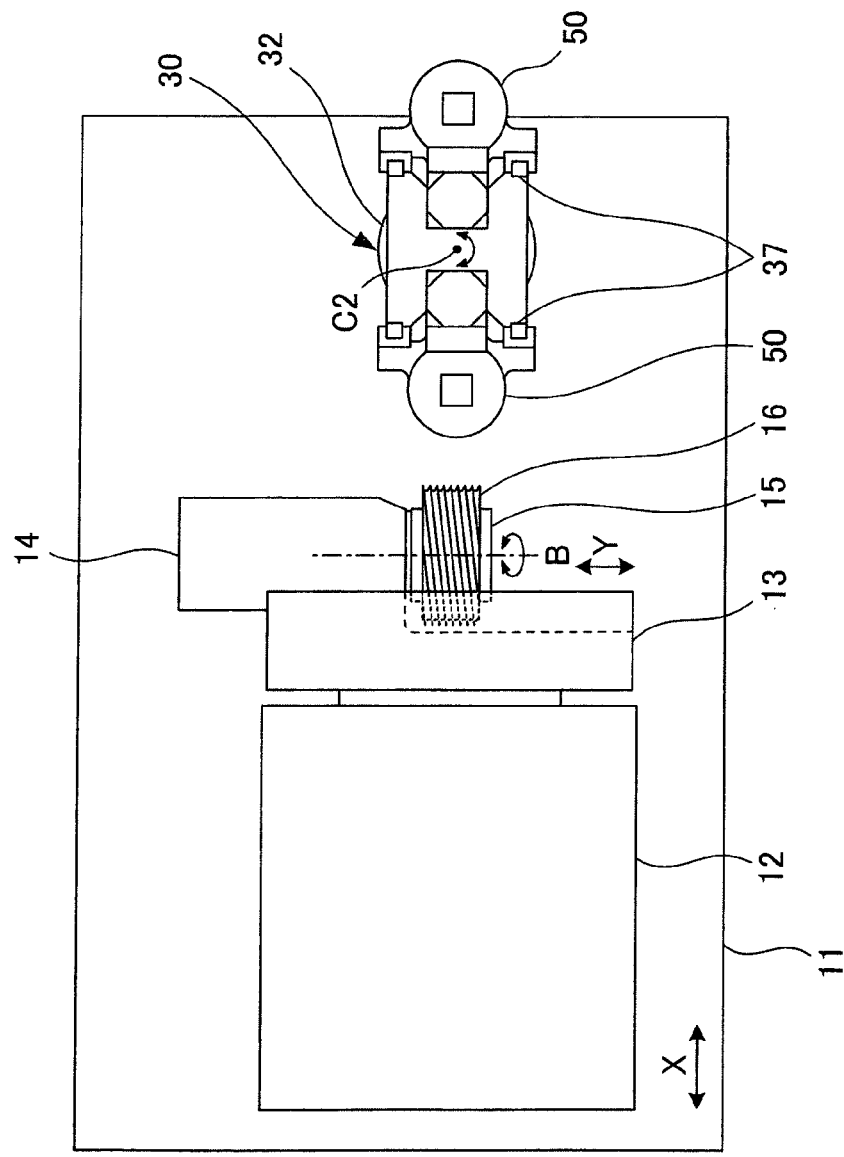
FIG. 2 is a plan view of the gear grinding machine in the embodiment of the present invention.

As shown in FIGS. 1 and 2, a gear grinding machine (gear processing machine) 1 is provided with a bed 11. A column 12 is supported on the bed 11 to be movable in a horizontal X-axis direction. A saddle 13 is supported by the column 12 to be capable of being elevated and lowered in a vertical Z-axis direction. A grinding wheel head 14 is supported by the saddle 13 to be movable in a Y-axis direction being perpendicular to the X-axis direction and the Z-axis direction. Moreover, a grinding wheel main spindle 15 is supported by the grinding wheel head 14 to be rotatable about a grinding wheel rotation axis B being parallel to the Y-axis direction. A threaded grinding wheel (gear processing tool) 16 having a helical thread formed on an outer peripheral surface is attachably and detachably mounted on a front end of the grinding wheel main spindle 15.

Accordingly, the threaded grinding wheel 16 can be moved in the X-axis direction, the Y-axis direction, and the Z-axis direction by driving the column 12, the saddle 13, and the grinding wheel head 14. In addition, the threaded grinding wheel 16 can be rotated about the grinding wheel rotation axis B by causing the grinding wheel head 14 to rotate the grinding wheel main spindle 15.

Figure 3:
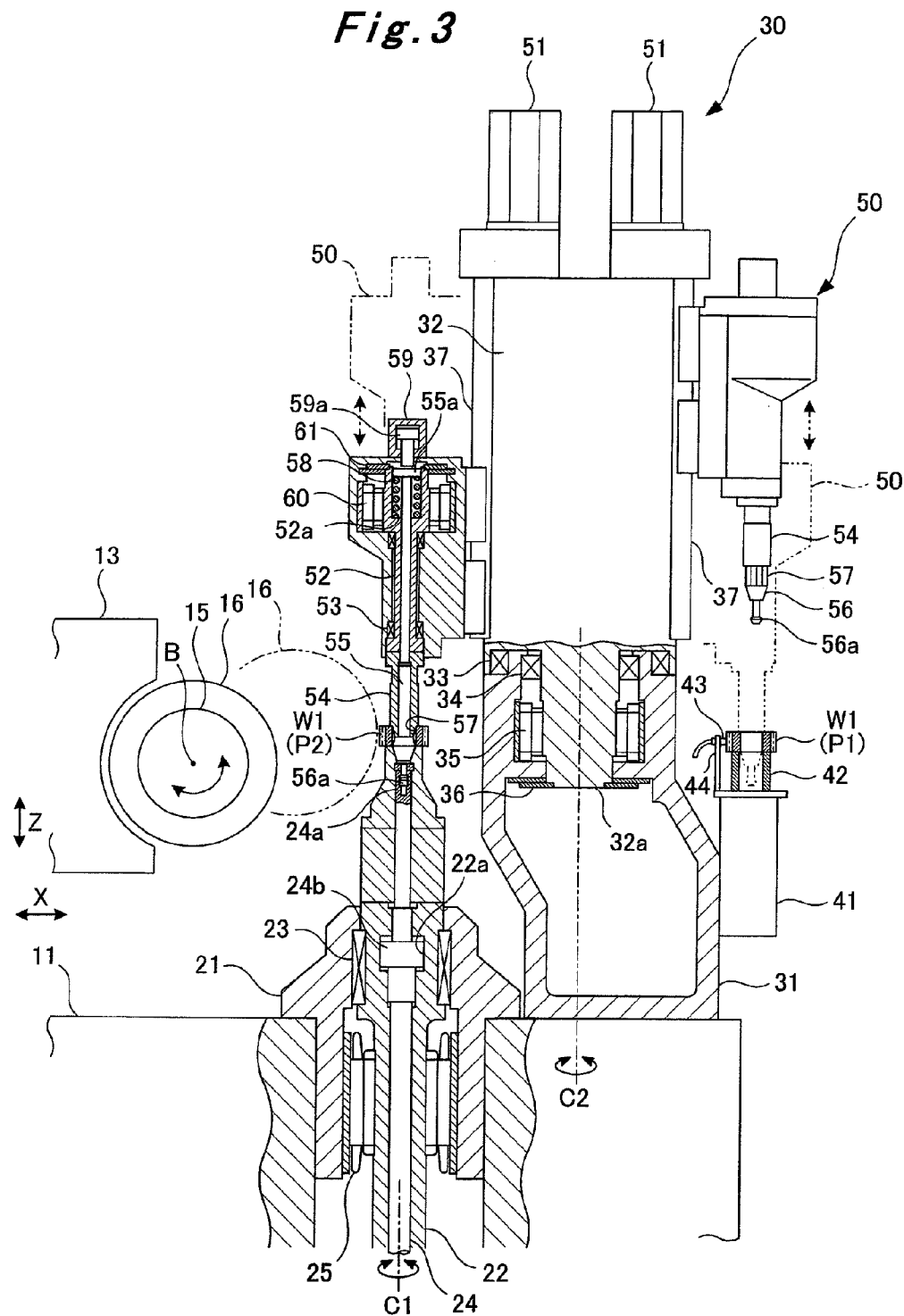
FIG. 3 is an enlarged view of a main portion of the gear grinding machine in the embodiment of the present invention.

Furthermore, as shown in FIGS. 1 and 3, a cylindrical table 21 is provided on the bed 11 to face the threaded grinding wheel 16 of the column 12. In the table 21, a cylindrical workpiece processing rotary shaft 22 is supported via a bearing 23 to be rotatable about a vertical workpiece rotation axis C1. A workpiece W1 being a processing target external gear can be clamped to an upper end of the workpiece processing rotary shaft 22. In addition, a workpiece clamping rod 24 is supported in the workpiece processing rotary shaft 22 to be slidable in a direction of the axis (workpiece rotation axis C1) thereof.

A grip portion 24a is formed at an upper end of the workpiece clamping rod 24. The grip portion 24a can grip an engagement portion 56a of an engagement member 56 to be described later. A piston portion 24b with a large diameter is formed in an intermediate portion of the workpiece clamping rod 24. The piston portion 24b is housed in a cylinder chamber 22a formed in the workpiece processing rotary shaft 22.

Specifically, when a hydraulic pressure is supplied to an upper space portion between the cylinder chamber 22a and the piston portion 24b, the piston portion 24b is pressed downward thereby causing the workpiece clamping rod 24 to slide downward. Meanwhile, when the hydraulic pressure is supplied to a lower space portion between the cylinder chamber 22a and the piston portion 24b, the piston portion 24b is pressed upward thereby causing the workpiece clamping rod 24 to slide upward.

A workpiece processing motor 25 formed of a stator and a rotor is provided between an inner peripheral surface of the table 21 and an outer peripheral surface of the workpiece processing rotary shaft 22. Hence, driving the workpiece processing motor 25 causes the workpiece clamping rod 24 to rotate together with the workpiece processing rotary shaft 22 and the workpiece W1 clamped to the upper end of the workpiece processing rotary shaft 22 can be thereby rotated about the workpiece rotation axis C1. At this time, the rotation angle of the workpiece processing rotary shaft 22 is detected by an unillustrated rotation angle detector provided at a lower end of the workpiece processing rotary shaft 22.

Furthermore, as shown in FIGS. 1 and 3, a workpiece revolution device (workpiece revolution means) 30 is provided on the bed 11 on a side opposite to the column 12 with a table 21 therebetween. Although described in detail later, the workpiece revolution device 30 is configured to convey the workpieces W1 held by tailstocks 50 between a workpiece replacement position P1 for performing replacement with an unprocessed workpiece W1 and a workpiece processing position P2 for grinding the unprocessed workpiece W1 by using the threaded grinding wheel 16.

The workpiece revolution device 30 has a fixed portion 31 and a rotating portion 32. The fixed portion 31 is fixed onto the bed 11 and the rotating portion 32 is supported by an upper portion of the fixed portion 31 via bearings 33, 34 to be rotatable about a workpiece revolution axis C2.

A shaft portion 32a is formed at a lower end of the rotating portion 32. A workpiece revolution motor 35 formed of a stator and a rotor is proved between an outer peripheral surface of the shaft portion 32a and an inner peripheral surface of the fixed portion 31. A rotation angle detector 36 is provided at a lower end of the shaft portion 32a. Hence, driving the workpiece revolution motor 35 can cause the rotating portion 32 to rotate about the workpiece revolution axis C2. At this time, the rotation angle of the rotating portion 32 is detected by the rotation angle detector 36.

Moreover, a workpiece replacement stand 41 is provided on a lateral surface of the fixed portion 31 which is on a side opposite to a lateral surface facing the table 21. A cylindrical workpiece attachment jig 42 is attached onto the workpiece replacement stand 41 and the workpiece W1 is attachable to the workpiece attachment jig 42. Specifically, the workpiece W1 is disposed at the aforementioned workpiece replacement position P1 by being attached to the workpiece attachment jig 42.

Moreover, a tooth alignment sensor (rotational phase detecting means) 43 is attached to the workpiece replacement stand 41 via an attachment plate 44. The tooth alignment sensor 43 is a non-contacting sensor such as a proximity sensor and detects the positions of tooth portions and tooth space portions (crests and troughs) of the workpiece W1, as well as those of both left and right tooth surfaces. The attachment position of the tooth alignment sensor 43 is set such that the tooth alignment sensor 43 faces the workpiece W1 located slightly above the workpiece replacement position P1.

Meanwhile, a pair of right and left guide rails 37 extending in the Z-axis direction is provided on each of lateral surfaces of the rotating portion 32 which are opposite to each other. On each of the pairs of guide rails 37, the tailstock 50 is supported to be capable of being elevated and lowered in the Z-axis direction. A tailstock elevating/lowering motor (workpiece moving means) 51 are provided for each of the tailstocks 50 in an upper portion of the rotating portion 32. Accordingly, each of the tailstocks 50 can be elevated and lowered in the Z-axis direction by driving a corresponding one of the tailstock elevating/lowering motors 51.

In each of the tailstocks 50, a cylindrical workpiece tooth aligning rotary shaft 52 is rotatably supported via a bearing 53 and a workpiece arbor 54 is connected to a lower end of the workpiece tooth aligning rotary shaft 52. In the workpiece tooth aligning rotary shaft 52 and the workpiece arbor 54, a workpiece holding rod 55 is supported to be slidable in the direction of axes of the workpiece tooth aligning rotary shaft 52 and the workpiece arbor 54. Moreover, the engagement member 56 is connected to a lower end of the workpiece holding rod 55 and the spherical engagement portion 56a is formed at a lower end of the engagement member 56. The engagement portion 56a is engageable with the aforementioned grip portion 24a of the workpiece clamping rod 24.

Furthermore, an annular collet 57 is provided over outer peripheral surfaces of the workpiece arbor 54 and the workpiece holding rod 55 in a portion between a lower end of the workpiece arbor 54 and a lower end of the workpiece holding rod 55. The collet 57 enables the workpiece W1 to be held from its inside and is formed to have an outer diameter slightly smaller than the inner diameter of the workpiece W1.

Moreover, an inner peripheral surface of the collet 57 is formed of two surfaces of an upper inclined surface and a lower inclined surface with an intermediate portion of the collet 57 in the axial direction thereof being the border between the two surfaces. The upper inclined surface and the lower inclined surface are configured to be capable of coming into contact respectively with an arbor inclined surface formed at the lower end of the workpiece arbor 54 and a rod inclined surface formed at the lower end of the workpiece holding rod 55. Accordingly, sliding the workpiece holding rod 55 causes the diameter of the collet 57 to increase or decrease due to the wedge action of the rod inclined surface on the lower inclined surface. Hence, hold or hold release (separation) of the workpiece W1 by the collet 57 can be performed.

A spring housing portion 52a with a large diameter is formed at an upper end of the workpiece tooth aligning rotary shaft 52 while a press portion 55a is formed at an upper end of the workpiece holding rod 55. The press portion 55a is slidably supported in the spring housing portion 52a and a workpiece holding spring 58 in a compressed state is interposed between the spring housing portion 52a and the press portion 55a. Moreover, a workpiece hold releasing cylinder 59 is provided at an upper end of the tailstock 50 and a rod 59a of the workpiece hold releasing cylinder 59 can press the press portion 55a of the workpiece holding rod 55.

Accordingly, pulling the workpiece holding rod 55 upward with the workpiece holding spring 58 causes the rod inclined surface to be elevated and press the lower inclined surface (inner peripheral surface) of the collet 57. Hence, the diameter of the collet 57 is increased and the workpiece W1 can be thereby held by the collet 57.

On the other hand, contracting the workpiece holding spring 58 by pressing the press portion 55a of the workpiece holding rod 55 with the rod 59a of the workpiece hold releasing cylinder 59 causes the rod inclined surface to be lowered and moved away from the lower inclined surface (inner peripheral surface) of the collet 57. Hence, the diameter of the collet 57 is reduced and the hold of the workpiece W1 by the collet 57 can be thereby released.

Moreover, a workpiece tooth aligning motor 60 formed of a stator and a rotor is provided between an inner peripheral surface of the tailstock 50 and an outer peripheral surface the workpiece tooth aligning rotary shaft 52 (spring housing portion 52a). A rotation angle detector 61 is provided at the upper end of the workpiece tooth aligning rotary shaft 52. Since driving the workpiece tooth aligning motor 60 causes the workpiece holding rod 55 to rotate together with the workpiece tooth aligning rotary shaft 52, the workpiece W1 held by the collet 57 can be rotated. At this time, the rotation angle of the workpiece tooth aligning rotary shaft 52 is detected by the rotation angle detector 61.

In addition, a NC device (control means) 90 integrally controlling the entire gear grinding machine 1 is provided in the gear grinding machine 1. The NC device 90 is connected to, for example, the column 12, the saddle 13, the grinding wheel head 14, the workpiece revolution device 30, the tooth alignment sensor 43, the tailstocks 50, and the like. This allows the NC device 90 to control a grinding operation of the workpiece W1 by the threaded grinding wheel 16 and also to control a tooth alignment operation which is performed before the grinding operation and which causes the threaded grinding wheel 16 and the workpiece W1 to establish a meshable rotational phase relationship, on the basis of inputted work specifications and processing (grinding) conditions.

Accordingly, when the workpiece W1 is to be ground by using the gear grinding machine 1, as shown in FIG. 3, a processed workpiece W1 is first replaced with an unprocessed workpiece W1 on the workpiece attachment jig 42 being at the workpiece replacement position P1.

Next, one of the tailstocks 50 having revolved is lowered onto the axis of the workpiece replacement position P1 and the collet 57 is placed inside the workpiece W1.

Then the diameter of the collet 57 is increased by the action of the workpiece holding spring 58 and the workpiece W1 is held. Thereafter, the tailstock 50 is slightly elevated.

Next, the workpiece tooth aligning motor 60 is driven to rotate workpiece W1 at a low tooth aligning rotational speed. At this time, the tooth alignment sensor 43 detects a rotational phase error of the workpiece W1 from the teeth (crests and troughs) of the workpiece W1.

Then the workpiece tooth aligning motor 60 is further driven in such a way that the rotational phase error is corrected, on the basis of the detected rotational phase error of the workpiece W1, and rotates the workpiece W1 at a high processing rotational speed.

At the same time, the tailstock 50 is further elevated and thereafter the workpiece revolution motor 35 is driven to make the tailstock 50 holding the workpiece W1 revolve about the workpiece revolution axis C2. This causes the workpiece W1 to move toward the workpiece processing position P2 and to be placed coaxially to the workpiece rotation axis C1.

Next, the tailstock 50 is lowered to dispose the workpiece W1 on the workpiece processing rotary shaft 22 being at the workpiece processing position P2.

At this time, the engagement portion 56a of the engagement member 56 is gripped by the grip portion 24a of the workpiece clamping rod 24 and the workpiece clamping rod 24 is also made to slide downward due to supply of hydraulic pressure to the upper space portion of the cylinder chamber 22a. This causes the workpiece W1 to be clamped between the workpiece processing rotary shaft 22 and the workpiece arbor 54. Hence, the workpiece W1 rotates about the workpiece rotation axis C1 at the processing rotational speed while being clamped. Note that the workpiece processing rotary shaft 22 rotates at the processing rotational speed described above in advance of the clamping of the workpiece W1.

Then, the column 12, the saddle 13, the grinding wheel head 14, the grinding wheel main spindle 15 are driven and the threaded grinding wheel 16 is thus made to mesh with the clamped workpiece W1 while being rotated about the grinding wheel rotation axis B.

Next, the threaded grinding wheel 16 is swung in the Z-axis direction from such a meshing state and the tooth surfaces of the workpiece W1 are thereby ground by edge surfaces of the threaded grinding wheel 16.

Subsequently, when the grinding of the workpiece W1 is completed, the threaded grinding wheel 16 is moved away from the workpiece W1 and the driving of the workpiece processing rotary shaft 22 and the workpiece tooth aligning rotary shaft 52 is then stopped. At this time, the hydraulic pressure is supplied to the lower space portion of the cylinder chamber 22a and the workpiece clamping rod 24 slides upward. Hence, the workpiece W1 is unclamped between the workpiece processing rotary shaft 22 and the workpiece arbor 54.

Next, the tailstock 50 is elevated, made to revolve, and then lowered to place the processed workpiece W1, which the tailstock 50 is holding, on the workpiece attachment jig 42.

Then the workpiece hold releasing cylinder 59 is driven to reduce the diameter of the collet 57 and release the hold of the workpiece W1. Thereafter, the tailstock 50 is elevated. Again the processed workpiece W1 is replaced with a new unprocessed workpiece W1 and the tooth alignment operation and the grinding operation described above are repeatedly performed.

In the embodiment described above, although the threaded grinding wheel 16 is used as a grinding wheel for grinding the workpiece W1, a disc-shaped grinding wheel (gear processing tool) may be used.

When such a grinding wheel is used, the rotational phase error of the workpiece W1 is detected by the tooth alignment sensor 43 and the workpiece W1 is then positioned by the workpiece tooth aligning motor 60 in such a way that the rotational phase error is corrected. Next, the workpiece W1 in the positioned state is made to revolve and is clamped at the workpiece processing position P2. Then the grinding of the workpiece W1 is performed by the above-described grinding wheel rotating about the grinding wheel rotation axis B, while rotationally indexing the workpiece processing rotary shaft 22 and the workpiece tooth aligning rotary shaft 52 by the single tooth space of the workpiece W1.

Furthermore, in the aforementioned embodiment, although the processing target gear to be ground is the workpiece W1 which is the external gear, the processing target gear may be a workpiece W2 which is an internal gear. A gear grinding machine (gear processing machine) capable of grinding such a workpiece W2 which is a processing target internal gear is described in detail by using parts (a) and (b) of FIG. 4. Note that members which are the same as the members described in the aforementioned embodiment are denoted by the same reference numerals and the overlapping descriptions are omitted.

Figure 4A:
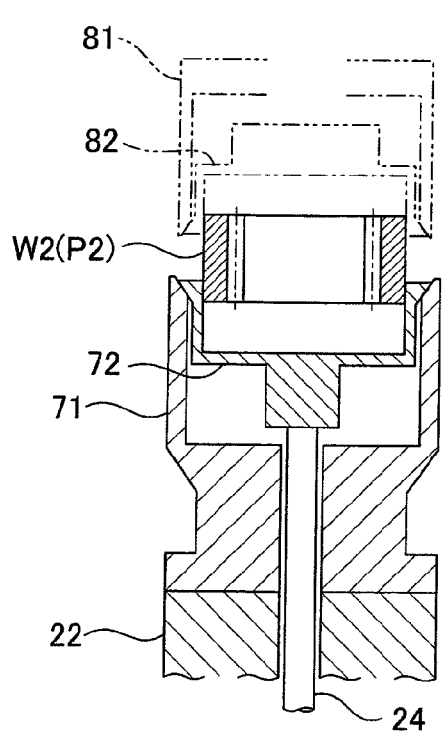
FIG. 4 is an enlarged view showing a main portion of a gear grinding machine in another embodiment of the present invention.
Figure 4B:
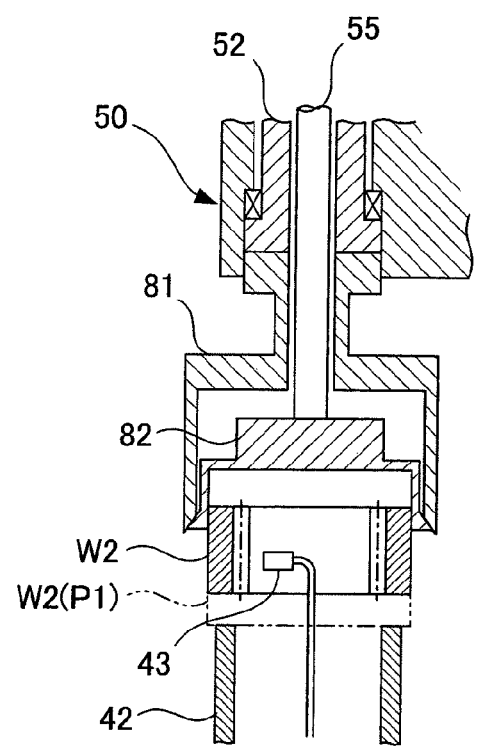

As shown in part (a) of FIG. 4, a cylindrical collet housing portion 71 is formed at the upper end of the workpiece processing rotary shaft 22 and a cylindrical workpiece clamping collet 72 is connected to the upper end of the workpiece clamping rod 24. The workpiece clamping collet 72 is disposed to be housed inside the collet housing portion 71.

The workpiece clamping collet 72 enables the workpiece W2 to be clamped from the outside thereof and the inner diameter thereof is formed to be slightly larger than the outer diameter of the workpiece W2. Moreover, an outer inclined surface is formed in an outer peripheral surface of an upper end of the workpiece clamping collet 72. The outer inclined surface is configured to be capable of coming into contact with an inner inclined surface formed at an upper end of the collet housing portion 71. Accordingly, sliding the workpiece clamping rod 24 causes the diameter of the upper end of the workpiece clamping collet 72 to increase or decrease due to the wedge action of the inner inclined surface on the outer inclined surface. Hence, clamping or unclamping of the workpiece W2 by the workpiece clamping collet 72 can be performed.

Furthermore, as shown in part (b) of FIG. 4, a cylindrical workpiece arbor 81 is connected to the lower end of the workpiece tooth aligning rotary shaft 52. The workpiece holding rod 55 is supported in the workpiece arbor 81 to be slidable in the axial direction thereof. A cylindrical workpiece holding collet 82 is connected to a lower end of the workpiece holding rod 55. The workpiece holding collet 82 is disposed to be housed in the workpiece arbor 81.

The workpiece holding collet 82 enables the workpiece W2 to be held from the outside thereof and is formed to have an inner diameter slightly larger than the outer diameter of the workpiece W2. Moreover, an outer inclined surface is formed in an outer peripheral surface of a lower end of the workpiece holding collet 82. The outer inclined surface is configured to be capable of coming into contact with an inner inclined surface formed at a lower end of the workpiece arbor 81. Accordingly, sliding the workpiece holding rod 55 causes the diameter of the lower end of the workpiece holding collet 82 to increase or decrease due to the wedge action of the inner inclined surface on the outer inclined surface. Hence, hold or hold release (separation) of the workpiece W2 by the workpiece holding collet 82 can be performed.

Note that, as shown in part (b) of FIG. 4, the tooth alignment sensor 43 is provided inside the workpiece attachment jig 42. Moreover, the threaded grinding wheel 16 is changed to one having such a size that the threaded grinding wheel 16 can mesh with inner teeth of the workpiece W2. Then the workpiece W2 is clamped by the workpiece clamping collet 72. Thereafter, the hold of the workpiece holding collet 82 is released and the workpiece holding collet 82 is retreated upward. Next, the grinding of the workpiece W2 is performed by the threaded grinding wheel 16 moved into the workpiece W2.

In the gear grinding machine of the present invention, the workpiece processing rotary shaft 22 is rotatably supported by the bed 11 while the workpiece tooth aligning rotary shaft 52 is rotatably supported in each of the tailstocks 50 of the workpiece revolution device 30 rotatably supported by the bed 11. This allows the workpiece processing motor 25 for rotating the workpiece processing rotary shaft 22 and the workpiece tooth aligning motor 60 for rotating the workpiece tooth aligning rotary shaft 52 to be provided separately.

In this configuration, during the tooth alignment of the workpiece W1, W2, the workpiece tooth aligning motor 60 simply rotates the workpiece W1, W2. During the grinding of the of the workpiece W1, the workpiece W1 is clamped by the workpiece processing rotary shaft 22 and the workpiece tooth aligning motor 60 rotates at the same processing rotational speed as that of the workpiece processing rotary shaft 22. Moreover, during the grinding of the workpiece W2, the workpiece tooth aligning motor 60 is not required to rotate since the retreat from the workpiece W2 has been performed.

Accordingly, a motor which is small and low in cost can be used as the workpiece tooth aligning motor 60. Furthermore, a relatively small motor can be used as the workpiece revolution motor 35 used for the revolution of the tailstocks 50 each including this workpiece tooth aligning motor 60. Moreover, rotatably supporting the workpiece processing rotary shaft 22 by the bed 11 with a high stiffness allows the workpiece processing rotary shaft 22 to be rotated without being affected by a processing load from the threaded grinding wheel 16. Thus, the grinding of the workpiece W1, W2 can be performed with high accuracy in a simple configuration.

In the aforementioned embodiment, a case where the gear processing machine of the present invention is applied to the gear grinding machine has been described. However, the present invention can be also applied to a hobbing machine which performs hob cutting with a hob cutter and skiving with a skiving hob.

INDUSTRIAL APPLICABILITY

The present invention can be applied to a gear grinding machine intended to properly perform tooth alignment between a grinding wheel and a processing target gear in a short time.

The invention claimed is:

1. A gear processing machine configured to perform a tooth alignment operation before processing a processing target gear using a gear processing tool, the tooth alignment operation causing the gear processing tool and the processing target gear to establish a meshable rotational phase relationship, the gear processing machine characterized in that the gear processing machine comprises:
 a workpiece processing rotary shaft rotatably supported by a bed and configured to rotate the processing target gear placed at a workpiece processing position for performing the processing by the gear processing tool;
 a tailstock capable of holding the processing target gear;
 workpiece revolution means, rotatably supported on the bed, for supporting the tailstock moveably in a workpiece revolution axis direction and for causing the tailstock to revolve about the workpiece revolution axis, between the workpiece processing position and a workpiece replacement position for performing replacement with an unprocessed processing target gear;
 workpiece moving means, provided in the workpiece revolution means, for moving the tailstock in the workpiece revolution axis direction;
 a workpiece tooth aligning rotary shaft provided in the tailstock and configured to rotate the processing target gear held by the tailstock;
 rotational phase detection means for detecting a rotational phase of the processing target gear rotated by the workpiece tooth aligning rotary shaft; and
 control means for controlling a rotation of the workpiece tooth aligning rotary shaft to cause the processing target gear to have such a rotational phase as to be meshable with the gear processing tool, on the basis of the rotational phase detected by the rotational phase detection means, before the processing target gear held by the tailstock is placed at the workpiece processing position by the workpiece revolution means and the workpiece moving means.

2. The gear processing machine according to claim 1, wherein
 the gear processing tool is a threaded grinding wheel having a helical thread formed on an outer peripheral surface thereof, and
 after controlling the rotation of the workpiece tooth aligning rotary shaft to cause the processing target gear to have such a rotational phase as to be meshable with the gear processing tool on the basis of the rotational phase detected by the rotational phase detection means before the processing target gear held by the tailstock is placed at the workpiece processing position by the workpiece revolution means and the workpiece moving means, the control means further controls the rotation of the workpiece tooth aligning rotary shaft to cause the processing target gear to rotate at a same rotational speed as a rotational speed of the workpiece processing rotary shaft rotating synchronously with the threaded grinding wheel.

* * * * *